US012054361B2

(12) United States Patent
Rytkönen

(10) Patent No.: US 12,054,361 B2
(45) Date of Patent: Aug. 6, 2024

(54) METHOD, COMPUTER PROGRAM AND EQUIPMENT FOR CONTROLLING CRANE AND METHOD FOR UPDATING CRANE

(71) Applicant: Konecranes Global Oy, Hyvinkää (FI)

(72) Inventor: Ekku Rytkönen, Rajamäki (FI)

(73) Assignee: Konescranes Global Oy, Hyvinkää (FI)

( * ) Notice: Subject to any disclaimer, the term of this patent is extended or adjusted under 35 U.S.C. 154(b) by 1348 days.

(21) Appl. No.: 16/471,192

(22) PCT Filed: Dec. 7, 2017

(86) PCT No.: PCT/FI2017/050865
§ 371 (c)(1),
(2) Date: Jun. 19, 2019

(87) PCT Pub. No.: WO2018/115573
PCT Pub. Date: Jun. 28, 2018

(65) Prior Publication Data
US 2020/0024109 A1   Jan. 23, 2020

(30) Foreign Application Priority Data

Dec. 20, 2016   (FI) ..................................... 20165994

(51) Int. Cl.
*B66C 13/08* (2006.01)
*B66C 13/46* (2006.01)
(Continued)

(52) U.S. Cl.
CPC ............ *B66C 13/085* (2013.01); *B66C 13/46* (2013.01); *B66C 19/002* (2013.01); *H04N 23/60* (2023.01)

(58) Field of Classification Search
None
See application file for complete search history.

(56) References Cited

U.S. PATENT DOCUMENTS 8,909,467 B2 * 12/2014 Lee .......................... B66C 13/48
                                                       700/255
9,302,890 B1    4/2016 Vogt et al.
(Continued)

FOREIGN PATENT DOCUMENTS

CN   104812693 A   7/2015
CN   105893940 A   8/2016
(Continued)

OTHER PUBLICATIONS

Osumi et al., "Development of Tele-operation System for a Crane without Overshoot in Positioning", The 2010 IEEE/RSJ International Conference on Intelligent Robots and Systems Oct. 18-22, 2010, Taipei, Taiwan (Year: 2010).*
(Continued)

*Primary Examiner* — Amelia Vorce
(74) *Attorney, Agent, or Firm* — Ziegler IP Law Group LLC.

(57) ABSTRACT

A method, computer program and equipment for controlling a crane and method for updating a crane. A crane is controlled or the crane is updated to be controlled by: a) forming video image at a lifting point of a crane; b) determining a current and a future position of a lifting member or of a load with respect to the formed video image; c) combining to the formed video image an indication of the future position of the lifting member or of the load; and d) performing repeatedly again steps b) and c) for real time indicating of the future position of the lifting member or of the load.

17 Claims, 2 Drawing Sheets

(51) Int. Cl.
*B66C 19/00* (2006.01)
*H04N 23/60* (2023.01)

(56) References Cited

U.S. PATENT DOCUMENTS

| | | | |
|---|---|---|---|
| 9,916,506 B1* | 3/2018 | Davis | G06V 10/22 |
| 2002/0024598 A1 | 2/2002 | Kunimitsu et al. | |
| 2002/0084916 A1 | 7/2002 | Shimizu et al. | |
| 2014/0107971 A1* | 4/2014 | Engedal | B66D 1/52 |
| | | | 702/150 |
| 2015/0122761 A1* | 5/2015 | Ford | B66C 19/00 |
| | | | 212/276 |
| 2015/0142174 A1 | 5/2015 | Ford et al. | |
| 2015/0144582 A1* | 5/2015 | Ford | B66C 13/46 |
| | | | 212/276 |
| 2015/0291400 A1* | 10/2015 | Rintanen | B66C 13/46 |
| | | | 700/214 |
| 2016/0031683 A1* | 2/2016 | Fenker | B66C 13/40 |
| | | | 212/276 |
| 2016/0035251 A1* | 2/2016 | Delplace | G09B 5/065 |
| | | | 434/66 |
| 2016/0119589 A1 | 4/2016 | Tanizumi et al. | |
| 2016/0137462 A1* | 5/2016 | Bakalyar | B66C 1/12 |
| | | | 414/800 |
| 2016/0167932 A1* | 6/2016 | Holmberg | B66C 19/002 |
| | | | 382/104 |
| 2016/0185574 A1 | 6/2016 | Enomoto et al. | |
| 2018/0029476 A1* | 2/2018 | Bouchard | B66C 13/50 |
| 2019/0016569 A1* | 1/2019 | Palberg | B66C 13/16 |
| 2019/0031477 A1* | 1/2019 | Stinis | B66C 13/46 |
| 2019/0308852 A1* | 10/2019 | Heimann | B66C 13/18 |
| 2019/0345009 A1* | 11/2019 | Ryman | B66C 13/40 |
| 2021/0223753 A1* | 7/2021 | Bramberger | G06Q 50/08 |

FOREIGN PATENT DOCUMENTS

| | | | | |
|---|---|---|---|---|
| DE | 10234729 A1 | * | 2/2004 | B66C 7/14 |
| EP | 0885833 A2 | * | 12/1998 | B66C 13/063 |
| EP | 3000762 B1 | * | 3/2017 | B66C 13/085 |
| JP | 2015076963 A | | 4/2015 | |
| JP | 2015189528 A | * | 11/2015 | B66C 13/00 |
| KR | 20100037257 A | | 4/2010 | |
| KR | 101646918 B1 | * | 8/2016 | B66C 13/16 |
| RU | 2326806 C1 | * | 6/2008 | B66C 23/90 |
| WO | 2010009570 A1 | | 1/2010 | |
| WO | WO-2010009570 A1 | * | 1/2010 | B66C 13/46 |
| WO | WO-2014157567 A1 | * | 10/2014 | B66C 13/46 |
| WO | 2015022001 A1 | | 2/2015 | |
| WO | 2017141320 A1 | | 8/2017 | |
| WO | WO-2017208435 A1 | * | 12/2017 | B66C 13/00 |

OTHER PUBLICATIONS

Lee et al., "Efficient Visual Feedback Method to Control a Three-Dimensional Overhead Crane", IEEE Transactions On Industrial Electronics, vol. 61, No. 8, Aug. 2014 (Year: 2014).*
European Patent Office, Extended European Search Report, Application No. 17884990.7, Mailed Jul. 16, 2020, 7 Pages.
The State Intellectual Property Office of People's Republic of China, Office Action, Application No. 201780077380.0. Issued Jan. 19, 2020, 5 Pages. (English Translation Attached).
The State Intellectual Property Office of People's Republic of China, Search Report. Application No. 201780077380.0, 2 Pages.
Finnish Patent Office, Search Report, U.S. Appl. No. 20/165,994, mailed Sep. 6, 2017, 2 pages.
Notification of Transmittal of International Search Report and Written Opinion of the International Searching Authority, Application No. PCT/FI2017/050865, mailed Mar. 13, 2018, 6 pages.
Written Opinion of the International Searching Authority, Application No. PCT/FI2017/050865, mailed Mar. 13, 2018, 7 pages.

* cited by examiner

Fig. 3

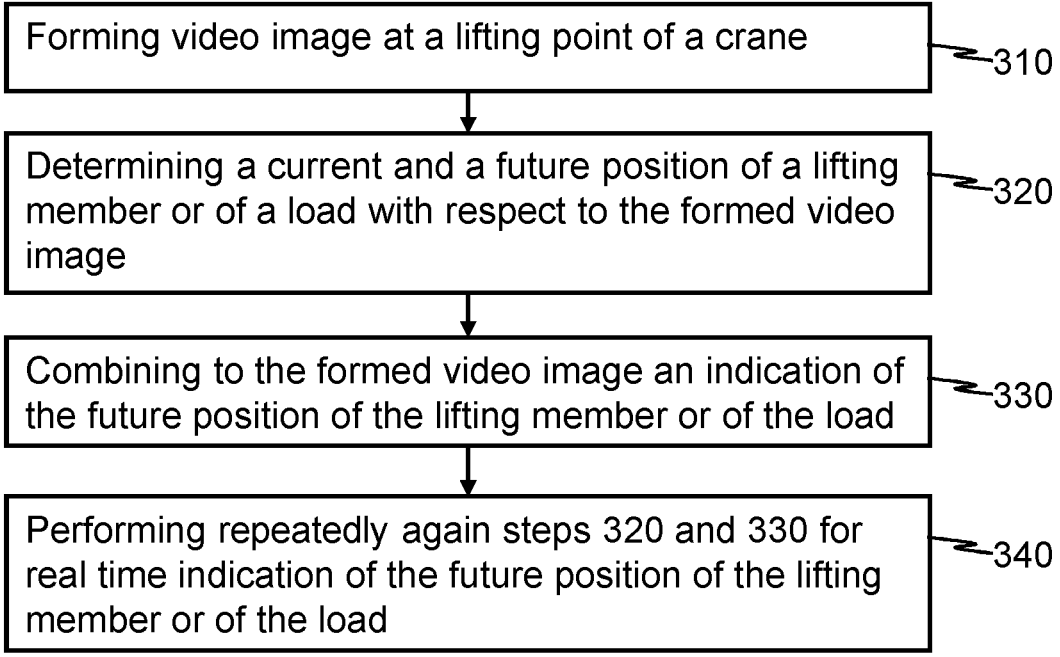

- Forming video image at a lifting point of a crane — 310
- Determining a current and a future position of a lifting member or of a load with respect to the formed video image — 320
- Combining to the formed video image an indication of the future position of the lifting member or of the load — 330
- Performing repeatedly again steps 320 and 330 for real time indication of the future position of the lifting member or of the load — 340

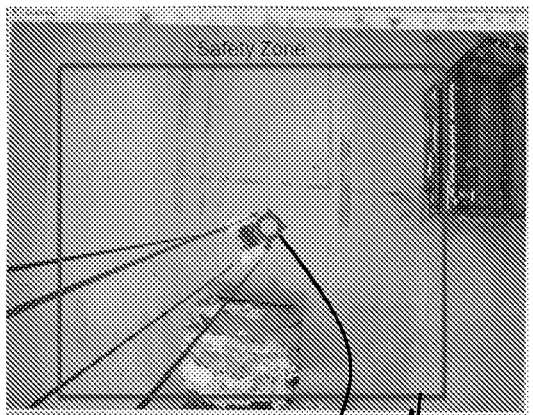

Fig. 4    410  420

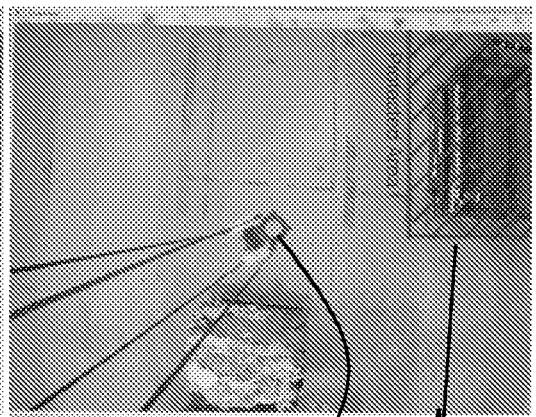

Fig. 5    410  510

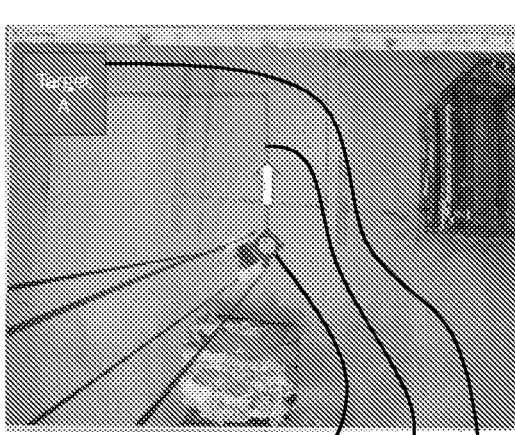

Fig. 6    410  610  620

METHOD, COMPUTER PROGRAM AND EQUIPMENT FOR CONTROLLING CRANE AND METHOD FOR UPDATING CRANE

TECHNICAL FIELD

The aspects of the disclosed embodiments generally related to a method, computer program and equipment for controlling a crane and a method for updating a crane.

BACKGROUND

This section illustrates useful background information without intent to admit any technique described herein being necessarily representative of the state of the art.

Crane use is a challenging task. A lifting member, such as a hook, and a load or a load target are typically far from a user in comparison to an acceptable tolerance of lifting. It is particularly difficult to estimate the true position of a lifting member that moves high up and sideways.

In some use sites, such as factories, there are strict security boundaries for the lifting, i.e. people must stay outside a give zone during the lifting. The accounting of the security boundaries is a part of safe lifting. Often, crane users i.e. operators estimate the security boundaries based on their own feelings. The operator may not necessarily be aware of the protection zone of the use site. This may cause confusion on using the crane.

It is also difficult to estimate a crane stopping position. Crane slowing ramps may cause difficulty for inexperienced operators, as the load still keeps on moving after the operator has stopped controlling the crane e.g. by depressing a button. Even an experienced operator may be challenged by a swing prevention the impact of which may sometimes be difficult to accurately anticipate.

Some modern cranes may be driven along a pre-programmed route or at least the crane may be programmed to evade protection zones. In this case, it may be difficult for the operator to perceive to where and along which route the crane is going to move. With present technology, the operator must recognize the target by name and remember the programmed route to be aware of the next movement of the crane, or frequently repeated routes could be e.g. painted to the floor. Likewise e.g. the security boundaries could be painted to the floor, but in practice the marking of painted boundaries is applicable to only few use sites.

Konecranes have developed an RTG-container crane Boxhunter, with which containers may be stacked one over five and there is room between the legs of a girder six containers in parallel in addition to a driving lane. In contrast to entire previous RTG development, Boxhunter has a cabin that is moved down. A required view at work region of the crane is arranged by means of video cameras. Hence, the operator gets in and out of the cabin in just seconds and the operator can supervise directly through the window and close to the cabin e.g. the lowering of a container to a truck or train container platform. The video image is provided e.g. from crane trolley attached camera that provides a direct view from straight above the lifting member. Additionally, for supervising the lifting there is provided a video image e.g. with diagonally downwards mounted cameras. The image of these cameras shows better the environment of the lifting point. The operator thus has more information available, which enables more accurate and safe steering controlling than before.

The aspects of the disclosed embodiments are directed to further improve accuracy and safety of crane controlling.

SUMMARY

According to a first aspect of the disclosed embodiments there is provided a method for controlling a crane, wherein:
a) video image is formed at a lifting point of a crane;
b) determining a current and a future position of a lifting member or a load with respect to the formed video image;
c) combining to the formed video image an indication of the future position of the lifting member or of the load; and
d) performing repeatedly again steps b) and c) for real time indicating of the future position of the lifting member or of the load.

Said forming of the video image may be implemented by a video camera located at a known lateral distance from the crane lifting member. Said lateral distance may be constant. Alternatively, said lateral distance may change crane movement during. Said step b) may take into account said change of the lateral distance.

Said future position may correspond to a situation in which the lifting member or load is lowered to its low position (i.e. as low as possible to lower at that position, e.g. on a floor, a ground, a loading platform of a truck or of a ship or onto a stack of containers). At a variable low position height, the future position of the lifting member or of the load may be determined using existing information about lowering height at the position in question or by measuring for the low position in question height or distance from the crane.

Said future position may be an estimated stopping position. The determining of the future position may take into account a speed and deceleration of the crane. Said future position may take into account a programmed trajectory of the crane. The method may comprise combining to the formed video image the programmed trajectory or a portion thereof.

The method may additionally combine to the formed video image an indication of protection zone of the crane. Said protection zone may be determined dynamically based on at least one of the following: a lifting height; a load mass; a load dangerousness, such as corrosiveness or ignition sensitivity; a crane movement direction; and a crane movement speed.

The method may additionally comprise determining a limitation of the trajectory of the crane in relation to the formed video image and combining to the formed video image an indication of said limitation of the trajectory of the crane. Said limitation may be based on a structural operating range of the crane and/or on the protection zone determined for the crane.

According to a second aspect of the disclosed embodiments there is provided a method for updating a crane, comprising:
mounting one or more video cameras to image environment of a lifting member of the crane, if there is no pre-existing suitable video camera; and
arranging crane control equipment to perform steps b)-d) of the first aspect using video images received from the video camera imaging the environment of the lifting member of the crane.

According to a third aspect of the disclosed embodiments there is provided a computer program comprising computer executable program code, which when executed controls an apparatus to perform the first aspect or any method of a related embodiment.

The computer program of the third aspect may comprise program code executable by any of the following, for example: a generic processor, a microprocessor, an application specific integrated circuit; and a digital signal processor. The computer program of the third aspect may be stored in a computer readable medium. Such a medium may be, for example, a disk, CDROM, DVD, USB-memory, memory card or other magnetic or optical memory medium.

According to a fourth aspect of the disclosed embodiments there is provided equipment for controlling a crane, comprising:

means arranged to form video image at a lifting point of a crane;

means arranged to determine a current and a future position of a lifting member or a load with respect to the formed video image;

means arranged to combine to the formed video image an indication of the future position of the lifting member or of the load; and means arranged to perform repeatedly again said determining and said combining for real time indicating of the future position of the lifting member or of the load.

Various embodiments of the present disclosure have been illustrated in connection with some aspects. Corresponding embodiments may yet be applicable to other aspects and embodiments related to them.

BRIEF DESCRIPTION OF DRAWINGS

The aspects of the disclosed embodiments will be described for an example only with reference to the accompanying drawings, in which:

FIG. 3 presents a flow chart of a method according to an embodiment; and

FIGS. 4-6 show screenshots illustrating some embodiments of the present disclosure.

DETAILED DESCRIPTION

In the following description, like reference signs denote like elements or steps.

Figure 1:
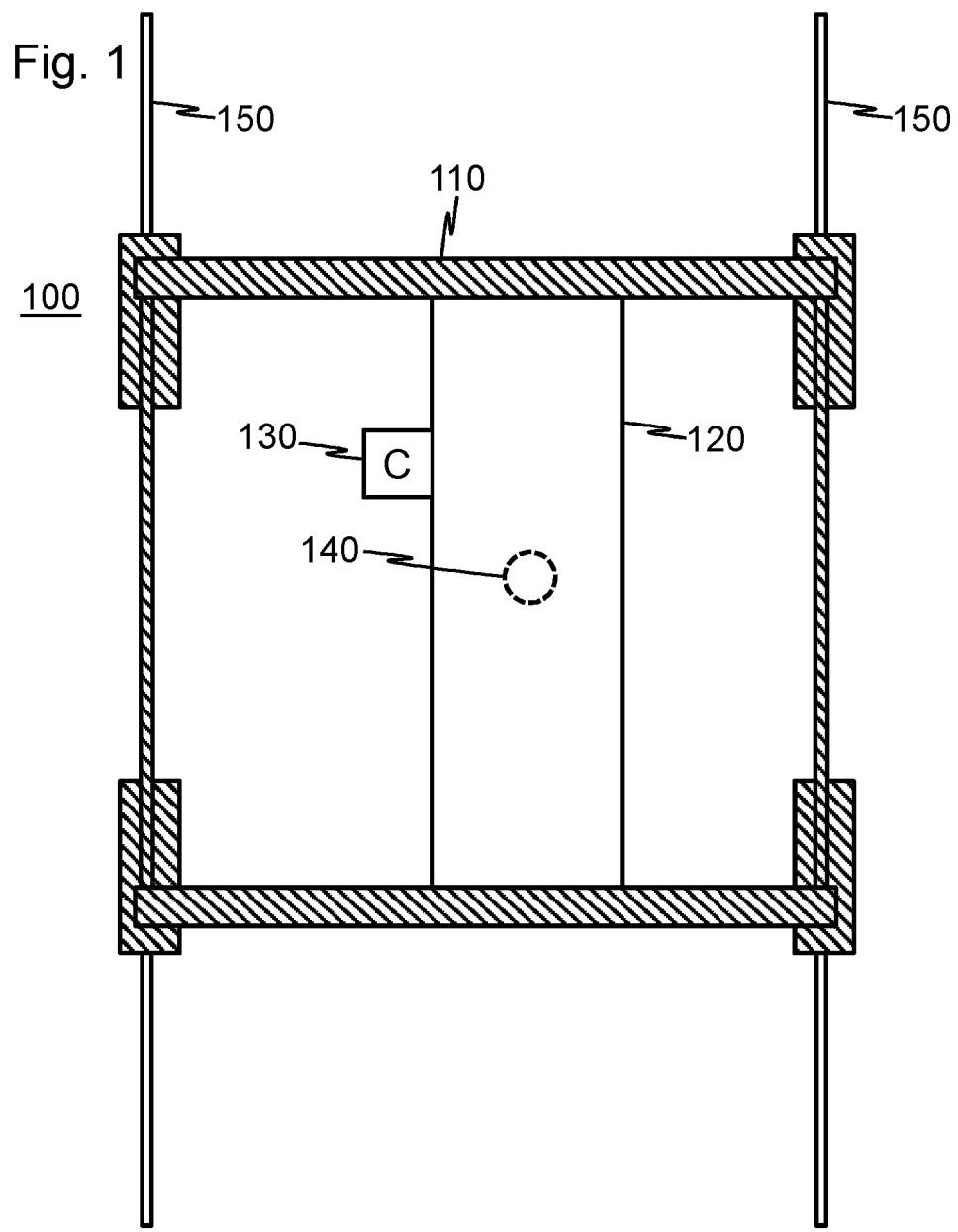
FIG. 1 presents, seen from above, a crane according to an embodiment.

FIG. 1 presents a crane 100 according to one embodiment, in this case an RTG container crane moving on tracks 150. For improved clarity of drawing, the dimensions are exaggerated.

Crane 100 has a longitudinally moving frame 110 and a laterally moving trolley 120. In this case, a body of the crane moves along tracks 150 below, but the crane could as well be e.g. a bridge crane that moves along tracks near height of hoisting equipment.

In the crane 100 there is a lifting member 140 drawn by a dashed line, because it is behind the moving trolley 120 when seen from above. In the crane there is also a camera C 130 drawn next to the trolley 120. There may be also more cameras, and/or the camera may be positioned under the trolley 120 for rain protection, but here it is drawn next to a trolley mainly in sake of clarity of the drawing.

Figure 2:
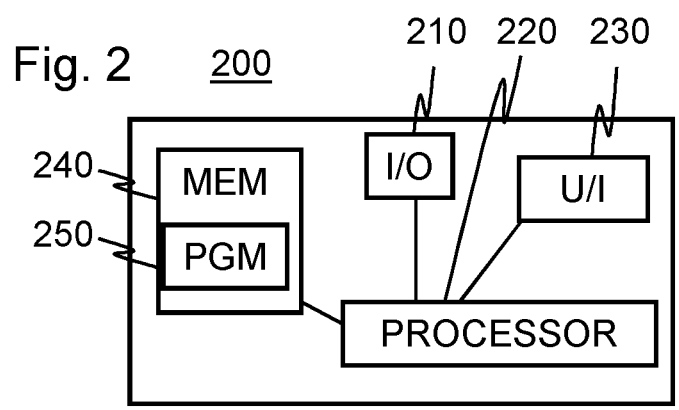
FIG. 2 presents block diagram of a crane controller equipment.

FIG. 2 presents a block diagram of crane controller equipment 200. The controller equipment 200 is implemented in this example using a programmable computer, such as an industrial computer or server. The controller equipment 200 comprises a data transfer connection 210, that may be e.g. a wireless or wired digital or analogue data transfer port (such as e.g. Ethernet, Ethernet/IP (industrial protocol), CAN, CIP, WLAN, RS-232). The controller equipment 200 additionally comprises a processor 220, possibly a user interface 230 (e.g. display, keyboard, pointing device, touch display), a memory 240 and stored in the memory 240, computer program code 250 for executing by the processor 220. The computer program code 250 and the processor 220 are arranged to be capable of collectively controlling operation of the controller equipment 200.

FIG. 3 presents flow chart of a method according to an embodiment method 300 for controlling a crane, comprising:

310 forming video image at a lifting point of a crane;

320 determining a current and a future position of a lifting member or a load with respect to the formed video image;

330 combining to the formed video image an indication of the future position of the lifting member or of the load; and 340 repeatedly performing again steps 320 and 330 for real time indicating of the future position lifting member or of the load.

Preferably, the forming of the video image is implemented by a video camera that locates at a known lateral distance from the lifting member of the crane, e.g. in the crane trolley. In this case, e.g. the position of the lifting member, when lowered, may be calibrated by lowering the lifting member once down and by pointing from the formed video image of the lifting member the point or by automatically recognizing the lifting member. For automatic recognition, a sign containing QR code can be attached to the lifting member or a character comprising the QR code can be painted to the lifting member.

Alternatively, said lateral distance may change during crane movement. For example, the video image may be formed by one or more fixedly mounted cameras that stay in place while the crane moves. Said step 320 may take into account said change of the lateral distance. In case of a fixedly mounted camera, the future position of the lifting member or of the load may be computed in relation to the formed video image taking into account a change in the video image caused by the crane movement in the geometry between the video image and the crane. Calculation can be implemented using as such known trigonometry with e.g. the processor 220. Alternatively, instead of using calculating, a particular table formed for this purpose can be used.

FIG. 4-6 show screen captures that illustrate some embodiments of the present disclosure.

Said future position may correspond to situation in which the lifting member or the load is lowered to its low position (i.e. that down that it can be lowered at that point, e.g. onto the floor, ground, loading platform of a truck or ship or onto a container), such as is presented in FIG. 4 with a lowering position indication 410. At a changing height low position, the future position of may be determined for the lifting member or for the load using existing information of the lowering height at the point in question or by measuring the height of the lowering position in question or the distance from the crane. E.g. in case of a container crane, previously stored information of a container field about container positions can be used such that the height is known under the lifting member to which a container being lowered by the crane will be or at which a container intended to be lifted is.

Said future position may be an estimated stopping position. Future position determining may take into account the speed and deceleration of the crane. Said future position may take into account a trajectory programmed to the crane. The method may comprise combining to the formed video image the programmed trajectory or an indication of a portion thereof, see in FIG. 6 a route 610 and a target 620 projected to the video image on the floor level.

In the method, an indication 420 (FIG. 4) of a protection zone of the crane may additionally be combined to the formed video image. Said protection zone may be dynamically determined based on at least one of the following: a lifting height; a load mass; a load dangerousness, such as corrosiveness or ignition sensitivity; a movement direction of the crane; and a speed of the crane movement.

In the method, a limitation of the trajectory of the crane may additionally be determined in relation to the formed video image and an indication may be combined of said limitation of the trajectory of the crane to the formed video image. Said limitation may be based on a range of the crane caused by the structure of the crane and/or to a protection zone determined for the crane, see an indication 510 of the protection zone shown in FIG. 5. The protection zones may be areas to which the guiding of the crane is prevented for avoiding material or human damages.

According to a second aspect there is provided a method for updating a crane, including:

mounting one or more video cameras to image environment of a lifting member of a the crane, if there is no suitable video camera already;

arranging control equipment of the crane to perform steps 320)-340) of the first aspect using the video image received from the camera imaging the environment of the lifting member of the crane.

An old crane may be updated according to any embodiment of the invention using equipment for controlling crane, comprising:

means arranged to form video image at a lifting point of a crane (e.g. one or more cameras 130);

means arranged to determine a current and a future position of a lifting member or a load with respect to the formed video image (e.g. processor 220 and/or a height measurement device of the lifting member);

means arranged to combine to the formed video image an indication of the lifting member or of the future position of the load (e.g. processor 220); and means arranged to perform repeatedly again said determining and said combining for real time indicating of the future position of the lifting member or of the load (e.g. processor 220).

The foregoing description provides non-limiting examples of some embodiments. It is however clear to a person ordinarily skilled in the art that the invention is not restricted to the presented details, but the invention can be implemented in other equivalent ways. For example, it should be appreciated that in the presented methods, the order of individual steps can be changed and some steps can be repeated a number of times or be completely omitted. It should also be appreciated that in this document terms comprise and include are open expressions not intended to be restrictive.

Furthermore, some of the features of the afore-described embodiments of this present disclosure may be employed without the corresponding use of other features. As such, the presented description shall be considered as merely illustrative of the principles of the present disclosure, and not in limitation thereof. Hence, the scope of the present disclosure is only restricted by the appended patent claims.

The invention claimed is:

1. A method for controlling a crane, wherein the crane is a bridge crane having a longitudinally moving frame and a lateral moving trolley, the method comprising:
   a) forming a video image at a lifting point of the crane;
   b) determining a current position and a future position of a lifting member of the crane or of a load with respect to the formed video image;
   c) combining to the formed video image an indication of the future position of the lifting member of the crane or of the load;
   d) performing repeatedly again phases b) and c) for real time indicating of the future position of the lifting member of the crane or of the load;
   determining a limitation of a trajectory of the crane in relation to the formed video image; and
   combining to the formed video image an indication of said limitation of the trajectory of the crane;
   wherein said limitation of the trajectory of the crane is based on a protection zone determined for the crane and wherein the protection zone is an area to which guiding of the crane is prevented.

2. The method according to claim 1, wherein the forming of the video image is implemented by a video camera located at a known lateral distance from the lifting member of the crane.

3. The method according to claim 2, wherein said lateral distance is constant.

4. The method according to claim 1, wherein said future position is an estimated stopping position.

5. The method according to claim 1, wherein the determining of the future position takes into account a speed and a deceleration of the crane.

6. The method according to claim 1, further comprising:
   the determining of the future position taking into account a programmed trajectory of the crane;
   combining to the formed video image the programmed trajectory or a portion thereof; and
   combining to the formed video image an indication of the programmed trajectory of the crane or of a portion of the programmed trajectory.

7. The method according to claim 1, wherein said limitation is further based on a structure of the crane.

8. The method according to claim 1, further comprising combining to the formed video image an indication of the protection zone of the crane.

9. The method according to claim 8, further comprising dynamically determining the protection zone based on at least one of the following: a lifting height; a load mass; and a load dangerousness.

10. A non-transitory memory medium comprising computer program having computer executable program code which, when executed by a controller device, controls the controller device to perform the method of claim 1.

11. A method for updating a crane with a longitudinally moving frame and a laterally moving trolley, the method comprising:
   mounting one or more video cameras to an image environment of a lifting member of the crane, if there is no pre-existing video camera;
   arranging crane control equipment, using video images received from the video camera imaging the environment of the lifting member of the crane, to:
   a) determine a current position and a future position of a lifting member of the crane or of a load with respect to the formed video image;

b) combine to the formed video image an indication of the future position of the lifting member of the crane or of the load; and
c) repeatedly performing phases a) and b) for real time indicating of the future position of the lifting member of the crane or of the load;
determining a limitation of a trajectory of the crane in relation to the formed video image; and
combining to the formed video image an indication of said limitation of the trajectory of the crane, wherein said limitation is based on a protection zone determined for the crane;
wherein the protection zone is an area to which a guiding of the crane is prevented.

12. Equipment for controlling a crane comprising:
a video camera arranged to form video image at a lifting point of a crane; and
a processor configured to:
  determine a current position and a future position of a lifting member of the crane or a load with respect to the formed video image;
  combine to the formed video image an indication of the future position of the lifting member of the crane or of the load;
  perform repeatedly again said determining and said combining for real time indicating of the future position of the lifting member of the crane or of the load; and
determining a limitation of a trajectory of the crane in relation to the formed video image; and
combining to the formed video image an indication of said limitation of the trajectory of the crane wherein said limitation is based on a protection zone determined for the crane;
  wherein the protection zone is an area to which a guiding of the crane is prevented.

13. The equipment according to claim 12, wherein the forming of the video image is implemented by a video camera located at a known lateral distance from the lifting member of the crane.

14. The equipment according to claim 13, wherein said lateral distance is constant.

15. The equipment according to claim 12, wherein said future position is an estimated stopping position.

16. The equipment according to claim 12, wherein the processor is configured to perform the determining of the future position taking into account a speed and a deceleration of the crane.

17. The equipment according to claim 12, wherein the processor is further configured to:
  perform the determining of the future position taking into account a programmed trajectory of the crane;
  combine to the formed video image the programmed trajectory or a portion thereof; and
  combine to the formed video image an indication of the programmed trajectory of the crane or of a portion of the trajectory.

* * * * *